(12) United States Patent
Sheikh-Bahaie et al.

(10) Patent No.: US 7,421,902 B2
(45) Date of Patent: Sep. 9, 2008

(54) FLUID PRESSURE SENSING METHOD AND APPARATUS

(75) Inventors: Kian Sheikh-Bahaie, Port Moody (CA); Shawn Lammers, Delta (CA); Robert Gordon Patterson, Burnaby (CA)

(73) Assignee: Smartire Systems, Inc., Richmond, British Columbia (CA)

( * ) Notice: Subject to any disclaimer, the term of this patent is extended or adjusted under 35 U.S.C. 154(b) by 6 days.

(21) Appl. No.: 11/580,693

(22) Filed: Oct. 13, 2006

(65) Prior Publication Data

US 2008/0110267 A1    May 15, 2008

(51) Int. Cl.
*G01L 7/00* (2006.01)
(52) U.S. Cl. ......................................................... 73/700
(58) Field of Classification Search .................. 73/700, 73/716, 717, 723, 733, 745; 303/119.3, 119.2
See application file for complete search history.

(56) References Cited

U.S. PATENT DOCUMENTS

| | | |
|---|---|---|
| 3,178,686 A | 4/1965 | Mills |
| 3,329,934 A | 7/1967 | Wooden |
| 3,651,455 A | 3/1972 | Hurlbutt et al. |
| 3,723,966 A | 3/1973 | Mueller et al. |
| 3,760,350 A | 9/1973 | Johnson |
| 3,810,090 A | 5/1974 | Davis, Jr. et al. |
| 3,873,965 A | 3/1975 | Garcia |
| 3,938,077 A | 2/1976 | Nakanishi et al. |
| 3,950,726 A | 4/1976 | Fujikawa et al. |
| 4,048,614 A | 9/1977 | Shumway |
| 4,052,696 A | 10/1977 | Enabnit |
| 4,057,783 A | 11/1977 | Blanchier |
| 4,067,235 A | 1/1978 | Markland et al. |
| 4,074,227 A | 2/1978 | Kalmus |
| 4,075,603 A | 2/1978 | Snyder et al. |
| 4,090,172 A | 5/1978 | Vesnic |
| 4,117,452 A | 9/1978 | Snyder et al. |
| 4,119,944 A | 10/1978 | Smith |
| 4,131,877 A | 12/1978 | Stewart et al. |
| 4,137,520 A | 1/1979 | Deveau |

(Continued)

FOREIGN PATENT DOCUMENTS

DE          3703128          8/1988

(Continued)

OTHER PUBLICATIONS

Brooke, Lindsay, "Michelin's MTM", Automotive Industries, 1987, pp. 29.

(Continued)

*Primary Examiner*—Jewel Thompson
(74) *Attorney, Agent, or Firm*—Knobbe, Martens, Olson & Bear, LLP

(57) ABSTRACT

A method and apparatus for producing a circuit carrier for mounting components of a pressure sensing circuit, circuit carrier formed thereby, an apparatus for housing a pressure sensor circuit carrier to form a pressure sensing apparatus and a pressure sensing system using the pressure sensing apparatus and a coupler for coupling the pressure sensing apparatus to a pressurized system. A housing has provisions for aligning and urging a circuit carrier to sealingly position a pressure sensor adjacent an opening in a wall extending through of housing. The wall defines a pressure sensing chamber operable to cooperate with a pressure coupler having a profile that sealingly engages the wall.

52 Claims, 12 Drawing Sheets

U.S. PATENT DOCUMENTS

| | | | |
|---|---|---|---|
| 4,148,008 A | 4/1979 | Lusk et al. |
| 4,160,234 A | 7/1979 | Karbo et al. |
| 4,163,208 A | 7/1979 | Merz |
| 4,196,414 A | 4/1980 | Muller |
| 4,210,898 A | 7/1980 | Betts |
| 4,229,728 A | 10/1980 | Tremba |
| 4,237,728 A | 12/1980 | Betts et al. |
| 4,246,567 A | 1/1981 | Miller |
| 4,263,579 A | 4/1981 | Corgan et al. |
| 4,286,253 A | 8/1981 | Nagy |
| 4,300,118 A | 11/1981 | Matsuda et al. |
| 4,310,826 A | 1/1982 | D'Angiolillo |
| 4,311,985 A | 1/1982 | Gee et al. |
| 4,319,220 A | 3/1982 | Pappas et al. |
| 4,363,020 A | 12/1982 | Venema |
| 4,376,931 A | 3/1983 | Komatu |
| 4,467,641 A | 8/1984 | Abraham |
| 4,487,154 A | 12/1984 | Daly |
| 4,510,484 A | 4/1985 | Snyder |
| 4,529,961 A | 7/1985 | Nishimura et al. |
| 4,531,112 A | 7/1985 | Thomas |
| 4,619,137 A | 10/1986 | Bott |
| 4,695,823 A | 9/1987 | Vernon |
| 4,703,650 A | 11/1987 | Dosjoub |
| 4,717,905 A | 1/1988 | Morrison |
| 4,723,445 A | 2/1988 | Ripley |
| 4,734,674 A | 3/1988 | Thomas et al. |
| 4,737,761 A | 4/1988 | Dosjoub |
| 4,742,857 A | 5/1988 | Gandhi |
| 4,816,802 A | 3/1989 | Doerksen |
| 4,843,872 A | 7/1989 | Hebert et al. |
| 4,887,067 A | 12/1989 | Reinecke |
| 4,891,973 A | 1/1990 | Bollweber et al. |
| 4,893,110 A | 1/1990 | Hebert et al. |
| 4,909,074 A | 3/1990 | Gerresheim |
| 4,935,738 A | 6/1990 | Pilato |
| 4,970,491 A | 11/1990 | Saint |
| 4,975,679 A | 12/1990 | Ballyns |
| 4,978,941 A | 12/1990 | Brown |
| 5,001,457 A | 3/1991 | Wang |
| 5,040,561 A | 8/1991 | Achterholt |
| 5,040,562 A | 8/1991 | Achterholt |
| 5,054,315 A | 10/1991 | Dosjoub |
| 5,061,917 A | 10/1991 | Higgs |
| 5,081,443 A | 1/1992 | Breit et al. |
| 5,090,237 A | 2/1992 | Schrumpf et al. |
| 5,109,213 A | 4/1992 | Williams |
| 5,163,320 A | 11/1992 | Goshima |
| 5,218,861 A | 6/1993 | Brown et al. |
| 5,228,337 A | 7/1993 | Sharpe et al. |
| 5,231,872 A | 8/1993 | Bowler |
| 5,285,189 A | 2/1994 | Nowicki |
| 5,289,160 A | 2/1994 | Fiorletta |
| 5,335,540 A | 8/1994 | Bowler |
| 5,452,608 A | 9/1995 | Green |
| 5,463,374 A | 10/1995 | Mendez et al. |
| 5,473,938 A | 12/1995 | Handfield et al. |
| 5,483,827 A | 1/1996 | Kulka et al. |
| 5,513,525 A | 5/1996 | Schurmann |
| 5,562,787 A | 10/1996 | Koch et al. |
| 5,600,301 A | 2/1997 | Robinson, III |
| 5,602,524 A | 2/1997 | Mock |
| 5,731,754 A | 3/1998 | Lee, Jr. et al. |
| 5,764,138 A | 6/1998 | Lowe |
| 5,774,048 A | 6/1998 | Achterholt |
| 5,838,229 A | 11/1998 | Robinson, III |
| 5,844,131 A | 12/1998 | Gabelmann |
| 5,900,808 A | 5/1999 | Lebo |
| 5,960,844 A | 10/1999 | Hamaya |
| 6,005,480 A | 12/1999 | Banzhof et al. |
| 6,031,450 A | 2/2000 | Huang |
| 6,101,870 A | 8/2000 | Kato et al. |
| 6,160,474 A | 12/2000 | Tsunetomi et al. |
| 6,163,255 A | 12/2000 | Banzhof et al. |
| 6,232,875 B1 | 5/2001 | DeZorzi |
| 6,243,007 B1 | 6/2001 | McLaughlin et al. |
| 6,292,096 B1 | 9/2001 | Munch |
| 6,340,930 B1 | 1/2002 | Lin |
| 6,542,076 B1 | 4/2003 | Joao |
| 6,549,125 B2 | 4/2003 | Nigon |
| 6,557,406 B2 | 5/2003 | Gabelmann |
| 6,580,363 B1 | 6/2003 | Wilson |
| 6,591,672 B2 | 7/2003 | Chuang |
| 6,662,825 B2 * | 12/2003 | Frank et al. ............... 137/557 |
| 6,799,455 B1 | 10/2004 | Neefeldt et al. |
| 6,799,812 B2 * | 10/2004 | Risch et al. ............. 303/119.2 |
| 6,805,000 B1 | 10/2004 | Sheikh-Bahaie |
| 6,805,001 B2 | 10/2004 | Luce |
| 6,862,929 B2 | 3/2005 | Luce |
| 6,970,076 B1 | 11/2005 | Starkey |
| 7,011,380 B2 * | 3/2006 | Meyer ..................... 303/119.3 |
| 7,019,630 B2 | 3/2006 | Katou |
| 7,059,178 B2 | 6/2006 | Fischer et al. |
| 7,116,217 B2 | 10/2006 | Okubo |
| 2002/0029627 A1 | 3/2002 | Delaporte et al. |
| 2002/0134150 A1 | 9/2002 | Shih |
| 2004/0055371 A1 | 3/2004 | Sanchez et al. |
| 2006/0061463 A1 | 3/2006 | Wilson, II |

FOREIGN PATENT DOCUMENTS

| | | |
|---|---|---|
| DE | 4106502 | 3/1992 |
| DE | 19756659 | 7/1999 |
| EP | 251355 | 1/1988 |
| EP | 0344003 | 11/1989 |
| EP | 0416325 A2 | 3/1991 |
| EP | 0431217 | 6/1991 |
| EP | 0626911 | 9/1993 |
| EP | 1000776 A2 | 5/2000 |
| EP | 1026015 | 8/2000 |
| EP | 1108568 | 6/2001 |
| EP | 1110764 | 6/2001 |
| EP | 1319529 | 6/2003 |
| FR | 1286388 | 1/1962 |
| FR | 2225300 | 11/1974 |
| FR | 2661373 | 10/1991 |
| FR | 2845031 A1 | 4/2004 |
| FR | 2884610 A1 | 10/2006 |
| GB | 2016383 A | 9/1979 |
| JP | 11342712 A2 | 12/1999 |
| JP | 21347813 A2 | 12/2001 |
| JP | 22316502 A2 | 10/2002 |
| WO | WO 93/02874 | 2/1993 |
| WO | WO 00/47430 | 8/2000 |
| WO | WO 01/38111 A1 | 5/2001 |
| WO | WO 01/74609 A1 | 10/2001 |
| WO | WO 02/068224 A1 | 9/2002 |
| WO | WO 03/000509 | 1/2003 |
| WO | WO 03/051653 A1 | 6/2003 |
| WO | WO 2007/084613 A2 | 7/2007 |

OTHER PUBLICATIONS

"Team Haulpak Product Support: Tire Management System", Haulpak, date: unknown, 23 pgs.

"Full Function Display User's Manual", SmarTire, ©2001 SmarTire Systems Inc., 36 pgs.

"Tire Pressure Monitoring System Owner's Manual", SmarTire, ©2001 SmarTire Systems Inc., 28 pgs.

\* cited by examiner

FLUID PRESSURE SENSING METHOD AND APPARATUS

BACKGROUND OF THE INVENTION

1. Field of Invention

This invention relates to a fluid pressure sensing method and apparatus and components thereof.

2. Description of Related Art

Pressure sensors for pressurized systems are known. Some pressure sensors are designed for permanent installation on a pressurized system and may have a pipe coupling or hose coupling to facilitate connection to the system. Often, screw threads are involved on such couplings and threaded engagement with the coupling secures the pressure sensor thereto.

One example of an area where such sensors are used is in vehicle tire pressure monitoring. Typically, pressure sensors for tire pressure monitoring are formed with housings that have a cylindrical protrusion having an inside threaded wall for engagement with an outside threaded portion of a valve stem on a tire. Typically, the tire is filled with air and then the pressure sensor is screwed on to the valve stem in such a manner that it cooperates with a valve actuator in the valve stem to cause pressurized fluid in the tire to be communicated to the pressure sensor.

A problem with the above type of sensor is that it must be removed to allow access to the valve in the valve stem in order to change the air pressure in the tire. This can be time consuming, especially where there are individual sensors on each wheel of a large transport truck for example.

SUMMARY OF THE INVENTION

In accordance with one aspect of the invention, there is provided a method of producing a circuit carrier for mounting components of a pressure sensing circuit. The method involves forming on a substrate a circuit portion and an antenna portion. Forming the antenna portion involves forming a radio frequency antenna on the antenna portion. The method further involves forming the circuit portion which involves causing at least one power supply mount for a power supply for the pressure sensing circuit to be formed at a side of the substrate such that the power supply projects outwardly from the substrate. Forming the circuit portion also involves causing a pressure sensor mount to be formed on the substrate such that when a pressure sensor is mounted to the mount a flat surface about a sensor opening of the pressure sensor is generally parallel and spaced apart from a first surface of the substrate and is adjacent the power supply. Forming the circuit portion further involves causing ancillary component mounts to be formed in the circuit portion, the ancillary component mounts being operable to facilitate mounting of ancillary components for effecting a transmitter function. Forming the circuit portion also involves causing circuit interconnections between the at least one power supply mount, the pressure sensor mount and the ancillary component mounts and the antenna to be formed on the substrate such that a pressure sensor mounted to the pressure sensor mount and ancillary components mounted to the ancillary component mounts are operable to receive power from a power supply mounted to the power supply mount and such that when the pressure sensor and ancillary components receive power from the power supply the transmitter function is effected, the transmitter function being operable to produce a transmittable signal in response to a pressure signal received from the pressure sensor, the transmittable signal being operable to be radiated by the antenna, for wireless reception by a remote receiver.

The power supply mount may include a battery mount.

The battery mount may include first and second battery mounts on opposite sides of the substrate, the pressure sensor mount being located between the first and second battery mounts.

The first and second battery mounts may be operably configured to facilitate mounting of disk-shaped batteries such that axes of the disk shaped batteries are generally parallel to a top surface of the substrate.

Forming the circuit portion and the antenna portion may involve causing the circuit portion to be located on a first end of the substrate and causing the antenna portion to be located on a second end of the substrate.

Forming the antenna portion may involve forming a serpentine conductor on the second end of the substrate.

Causing the ancillary component mounts to be formed in the circuit portion may involve causing switch contacts to be formed on the substrate, for mounting a switch thereto, and causing the circuit interconnections to be formed on the substrate comprises causing the circuit interconnections to connect the switch contacts to at least one of the ancillary component mounts, the power supply mount and the pressure sensor mount.

Causing the switch contacts to be formed on the substrate may involve causing the switch contacts to be formed on a second surface of the substrate, wherein the second surface is generally parallel and spaced apart from the first surface.

Producing a pressure sensor circuit assembly may involve installing a power supply on the power supply mount of the circuit carrier and installing a pressure sensor on the pressure sensor mount of the circuit carrier, and installing ancillary components on the ancillary component mounts of the circuit carrier, such that the ancillary components are operable to effect the transmitter function.

Housing the pressure sensor circuit assembly may involve receiving the circuit portion in a cavity of a body having a wall defining a pressure sensing chamber such that the opening in the pressure sensor is aligned with an opening in the pressure chamber. The method may further involve urging the substrate in a direction tending to press the flat surface of the pressure sensor against a seal between the flat surface and a portion of the wall defining the pressure chamber, such that the opening in the pressure sensor is in fluid communication with the opening in the pressure chamber and such that the seal prevents ambient pressure from interfering with communication of fluid between the opening in the pressure sensor and the opening in the pressure chamber.

Receiving may involve aligning the opening in the pressure sensor with the opening in the pressure chamber.

Aligning may involve guiding the circuit assembly into a position relative to the pressure chamber such that the opening in the pressure sensor is aligned with the opening in the pressure chamber.

Guiding may involve confining lateral movement of the circuit assembly.

Guiding may involve guiding edges on opposite sides of the substrate to position the substrate relative to the pressure chamber while the substrate is moved into the cavity.

Urging may involve applying a force to a second surface of the substrate, the second surface being opposite the first surface.

Applying the force may involve causing the second surface of the substrate to bear upon a support in the cavity.

Causing the second surface of the substrate to bear upon the support may involve causing the second surface to bear upon first and second spaced apart supports.

The method may involve holding a resilient switch actuator adjacent switch contacts formed on the substrate.

Holding may involve receiving the switch actuator in an opening in the outer wall.

Holding may involve fastening a holder to the outer wall such that a surface of the switch actuator is accessible from outside the body.

In accordance with another aspect of the invention, there is provided a circuit carrier apparatus for a fluid pressure sensor. The apparatus includes a substrate having first and second opposite edges, first and second opposite ends and first and second opposite facing surfaces. The apparatus also includes a circuit portion on the first end and an antenna portion on the second end. The antenna portion includes a radio frequency antenna. The circuit portion may include at least one power supply mount for a power supply for the pressure sensing circuit, the power supply mount being located at a side of the substrate and such that the power supply projects outwardly from the substrate. The circuit portion may also include a pressure sensor mount formed on the substrate such that when a pressure sensor is mounted to the mount, a flat surface about a sensor opening on the pressure sensor is generally parallel and spaced apart from the first opposite facing surface and is adjacent the power supply. The circuit portion further includes ancillary component mounts formed in the circuit portion, the ancillary component mounts being operable to facilitate mounting of ancillary components for effecting a transmitter function. The circuit portion also includes circuit interconnections between the at least one power supply mount, the pressure sensor mount, the ancillary component mounts and the antenna such that a pressure sensor mounted to the pressure sensor mount and ancillary components mounted to the ancillary component mounts are operable to receive power from a power supply mounted to the power supply mount and such that when the pressure sensor and ancillary components receive power from the power supply a transmitter function is effected, the transmitter function is operable to produce a transmittable signal in response to a pressure signal received from the pressure sensor, the transmittable signal being operable to be radiated by the antenna, for wireless reception by a remote receiver.

The power supply mount may include a battery mount.

The battery mount may include first and second battery mounts on opposite sides of the substrate, the pressure sensor mount being located between the first and second battery mounts.

The first and second battery mounts are operably configured to facilitate mounting of disk-shaped batteries such that axes of the disk shaped batteries are generally parallel to a top surface of the substrate.

The antenna portion may involve a serpentine conductor on the second end of the substrate.

The apparatus may include switch contacts formed on the substrate, for cooperating with a switch contactor, the switch contacts being connected by the circuit interconnections to at least one of the ancillary component mounts, the power supply mount and the pressure sensor mount.

The switch contacts may be formed on the second surface of the substrate.

The pressure sensor circuit apparatus may include the circuit carrier and may also include a power supply installed on the power supply mount, a pressure sensor installed on the pressure sensor mount and ancillary components installed on the ancillary component mounts, such that the ancillary components are operable to effect the transmitter function.

In accordance with another aspect of the invention, there is provided an apparatus for housing a pressure sensor circuit. The apparatus includes a body which may include an outer wall defining a cavity operably configured to hold a substrate carrying a pressure sensor having a pressure sensing opening. The body also includes an inner wall inside the cavity defining a pressure sensing chamber, an opening in the inner wall, and a seal interface about the opening. The body further includes aligning provisions for aligning the pressure sensor opening with the opening in the inner wall to provide for communication of fluid between the pressure sensing chamber and the pressure sensor opening. The body also includes urging provisions for urging the pressure sensor against a seal adjacent the seal interface, such that the opening in the pressure sensor is in fluid communication with the opening in the inner wall and such that the seal prevents ambient pressure from interfering with communication of fluid between the opening in the pressure sensor and the opening in the inner wall.

The aligning provisions may include guiding provisions for guiding the substrate into a position in which the opening in the pressure sensor is aligned with the opening in the inner wall.

The guiding provisions may include stops operable to contact the first and second sides of the substrate for confining lateral movement of the circuit assembly.

The first and second sides of the substrate may have first and second edges respectively, and the stops may include first and second stops operably configured to bear on the first and second edges to laterally position the substrate relative to the inner wall.

The urging provisions may include provisions for applying a force on the second opposite surface of the substrate.

The provisions for applying a force may include a support on the outer wall of the body and facing inside the cavity, wherein the second opposite surface of the substrate to bears upon the support.

The support may include first and second spaced apart supports on the outer wall and facing into the cavity, wherein the second opposite surface of the substrate to bears upon the first and second supports.

The apparatus may further include holding provisions for holding a resilient switch actuator in the outer wall such that the switch actuator is operable to make contact with switch contacts formed on the second opposite surface of the substrate.

The holding provisions may include a switch opening and the switch opening may be operable to receive the switch actuator.

The holding provisions may further include a flat member having an opening permitting access to a surface of the switch actuator the flat member being fastened to the body such that the resilient switch actuator provides a seal to prevent ingress and egress of fluid relative to the cavity through the switch actuator opening.

In accordance with another aspect of the invention, there is provided a pressure sensor apparatus. The pressure sensor apparatus includes a circuit carrier apparatus including a substrate having first and second opposite edges, first and second opposite ends and first and second opposite facing surfaces. The apparatus also includes a circuit portion on the first end and an antenna portion on the second end. The antenna portion includes a radio frequency antenna and the circuit portion includes at least one power supply located at a side of the substrate and such that the power supply projects outwardly from the substrate. The circuit portion also includes a pressure sensor having a flat surface and a pressure sensor opening on the flat surface, the flat surface being generally parallel and spaced apart from the first opposite facing surface and adjacent the power supply. The circuit portion further includes a transmitter connected to the pressure sensor for producing a signal for radiation by the antenna in response to a sense signal produced by the pressure sensor. The pressure sensor apparatus includes a housing for housing the circuit carrier apparatus. The housing includes a body that has an outer wall defining a cavity operably configured to hold the circuit portion of the substrate. The body also has an inner wall inside the cavity defining a pressure sensing chamber, an opening in the inner wall, a seal about the opening and aligning provisions for aligning the pressure sensor opening with the opening in the inner wall to provide for communication of fluid between the pressure sensing chamber and the pressure sensor opening. The body further has urging provisions for urging the pressure sensor against the seal, such that the opening in the pressure sensor is in fluid communication with the opening in the pressure sensing chamber and such that the seal prevents ambient pressure from interfering with communication of fluid between the opening in the pressure sensor and the opening in the pressure sensing chamber. The housing also includes potting material in the cavity and about the circuit portion for securing the substrate in the cavity. The housing further includes a cover for covering the antenna portion, the cover being sealingly engaged with the housing to prevent ingress and egress of fluid relative to the cavity.

The inner wall may define a first opening into the pressure sensing chamber, the first opening being operable to receive a pressure coupling for coupling fluid pressure from a pressurized system to the pressure sensing chamber.

The outer wall may define a second opening into the pressure sensing chamber, the second opening being generally coaxial with the first opening to permit a projection on the pressure coupling to be inserted into the first opening to extend through the pressure sensing chamber such that a portion of the pressure coupling extends out of the second opening.

The aligning provisions may involve guiding provisions for guiding the substrate into a position in which the opening in the pressure sensor is aligned with the opening in the inner wall.

The guiding provisions may involve stops operable to contact the first and second sides of the substrate for confining lateral movement of the circuit assembly.

The first and second sides of the substrate may have first and second edges respectively, and the stops may include first and second stops operably configured to bear the first and second edges to laterally position the substrate relative to the inner wall.

The urging provisions may include provisions for applying a force to the second opposite surface of the substrate.

The provisions for applying a force may include a support on the outer wall of the body, the support facing inside the cavity, the second opposite surface of the substrate bearing upon the support.

The support may include first and second spaced apart supports on the outer wall and facing into the cavity, wherein the second opposite surface of the substrate to bears upon the support.

The circuit portion may include switch contacts formed on the second opposite facing side of the substrate, the switch contacts being operably connected to the pressure sensor and the apparatus may further comprise a resilient switch actuator and holding provisions for holding the resilient switch actuator in the outer wall such that the switch actuator is operable to make contact with the switch contacts.

The holding provisions may include a switch opening holding the switch actuator.

The holding provisions may further include a flat member having an opening permitting access to a surface of the switch actuator the flat member being fastened to the body such that the resilient switch actuator provides a seal to prevent ingress and egress of fluid relative to the cavity through the switch actuator opening.

In accordance with another aspect of the invention, there is provided a pressure sensing system including the pressure sensor apparatus above and a pressure coupler operably configured to communicate with the pressure sensing chamber of the pressure sensor apparatus above to communicate fluid pressure to the pressure sensor.

The pressure coupler may include a projection having an inlet opening operably configured to communicate with a pressurized system to receive pressurized fluid therefrom, and the projection and the pressure sensing chamber may be operably configured such that the projection is sealingly received in the pressure sensing chamber and such that fluid entering the inlet opening is communicated to the pressure sensor through the pressure sensing chamber.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
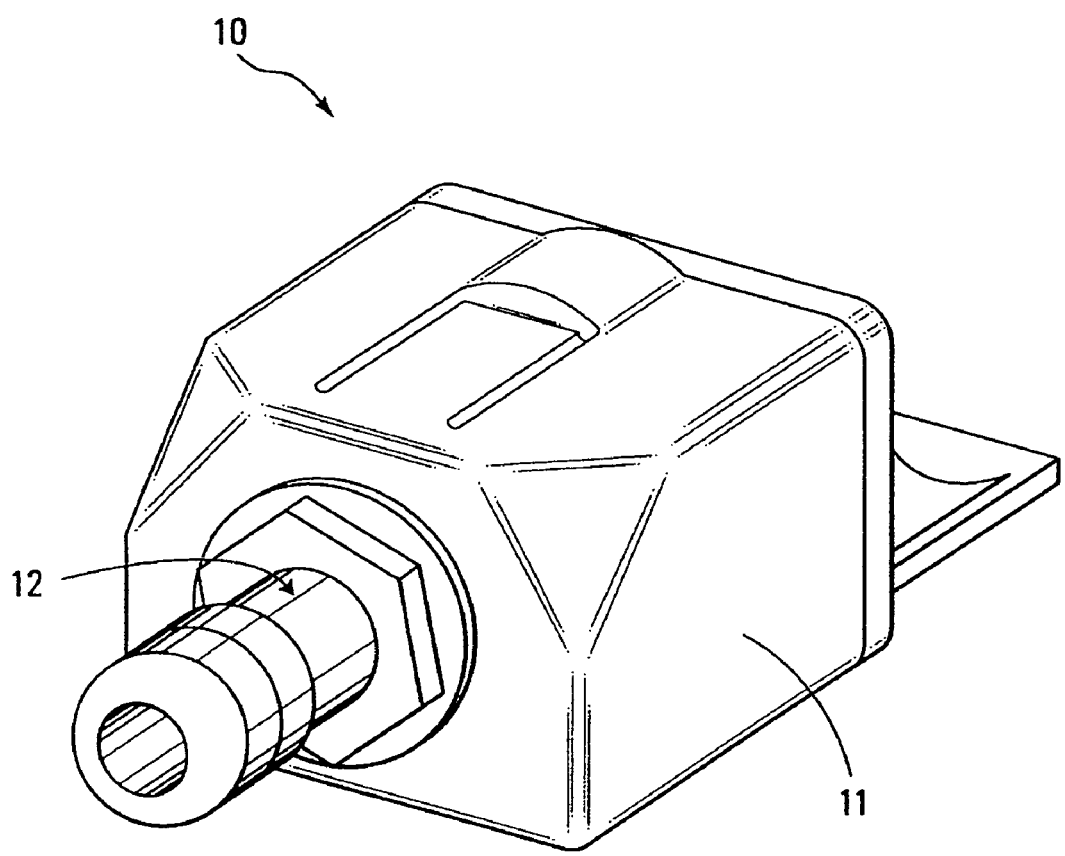
FIG. 1 is a perspective view of a pressure sensing system according a first embodiment of the invention.

Referring to FIG. 1, a pressure sensing system according to a first embodiment of the invention is shown generally at 10 and includes a pressure sensor apparatus 11 mounted on a pressure coupler shown generally at 12.

Figure 2:
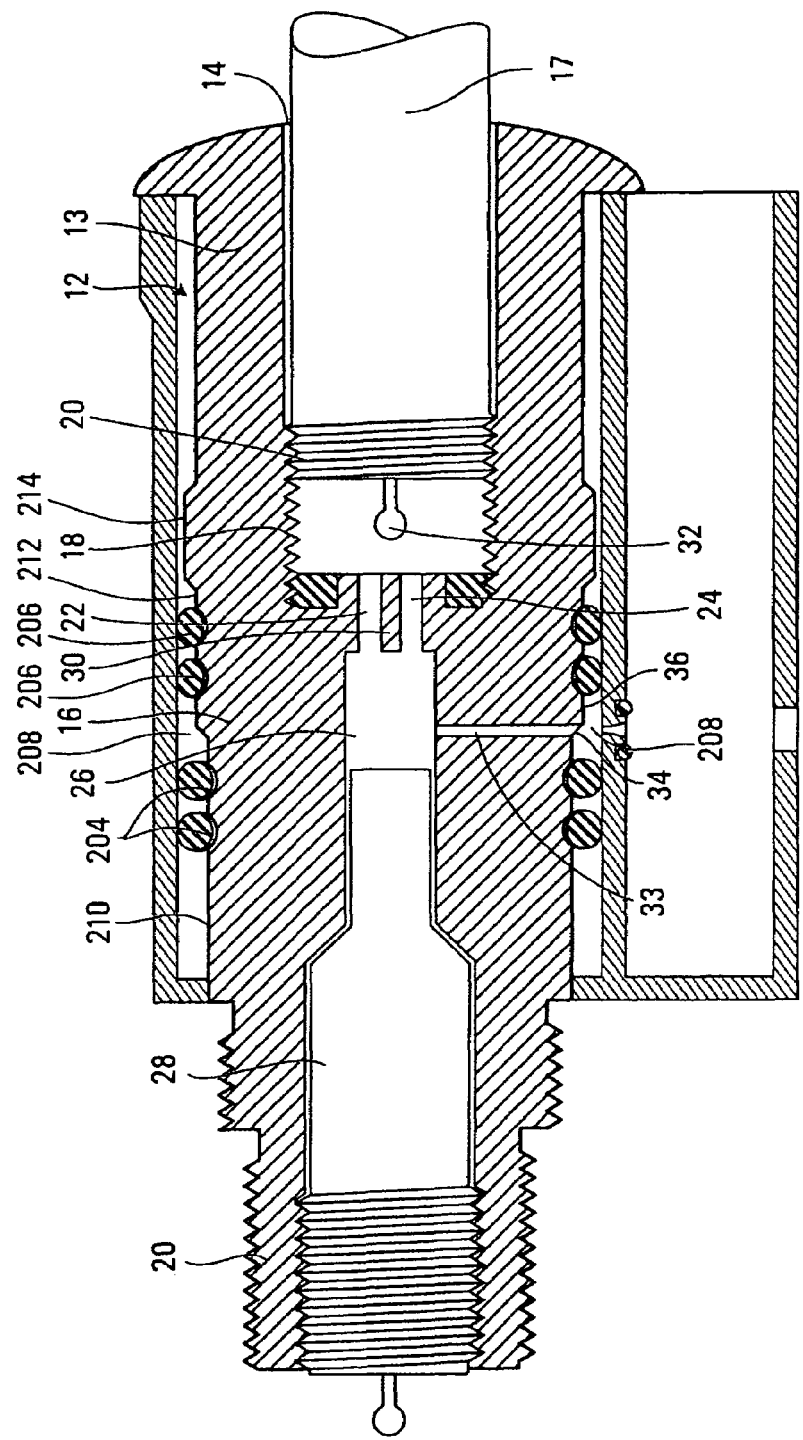
FIG. 2 is a cross-sectional view of a pressure sensor apparatus of the pressure sensing system of FIG. 1 connected to a pressure coupler.

Referring to FIG. 2, the pressure coupler 12 in this embodiment includes a body 13 having an inlet opening 14 for receiving pressurized fluid from a pressurized system. In one embodiment, the pressurized system may include a tire (not shown) having a valve stem 17 operable to be received in the inlet opening 14. In such an embodiment, the inlet opening 14 may be threaded as shown at 18, for example, to receive corresponding threads 20 of an end of the valve stem 17.

In this embodiment, the body 13 also has a projection 16 having first and second passages 22 and 24 in communication with the inlet opening 14 which are connected to and in communication with a valve bore 26 operable to receive a valve core 28 in sealing engagement therein.

Adjacent the passages 22 and 24, a solid portion 30 of the body is disposed approximately centrally in a bottom portion of the inlet opening 14 to bear upon a valve actuator 32 of the valve stem 17 when the threads 20 on the valve stem 17 are fully engaged with the threads 18 of the inlet opening 14. Thus, the valve of the valve stem 17 is opened as the valve stem is screwed into the inlet opening 14 by action of the valve actuator 32 being pressed inwardly due to it bearing upon the solid portion 30 as the pressure coupler is threaded thereon. Fluid in the tire with which the valve stem 17 is in communication, is operable to pass through the passages 22 and 24 to the valve bore 26. A further passageway 33 provides for communication between the valve bore 26 and an external opening 34 on an exterior surface 36 of the projection 16.

Figure 3:
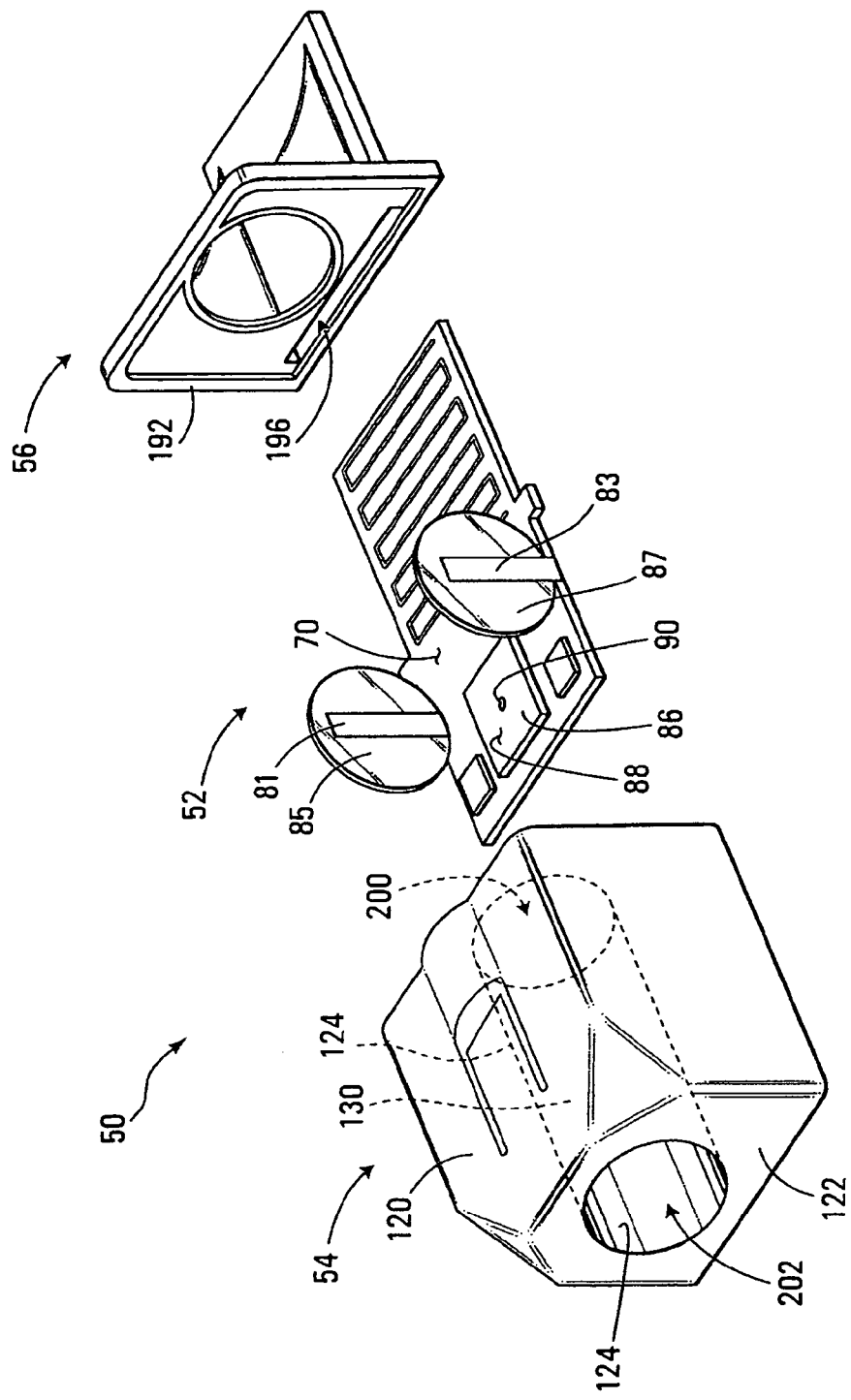
FIG. 3 is an exploded perspective view of the pressure sensor apparatus shown in FIG. 1.

Referring to FIG. 3, the pressure sensor apparatus is shown in greater detail at 50 and includes a circuit carrier apparatus shown generally at 52, a housing shown generally at 54 for housing the circuit carrier apparatus and a cover 56 for covering a portion of the circuit carrier apparatus.

Figure 4:
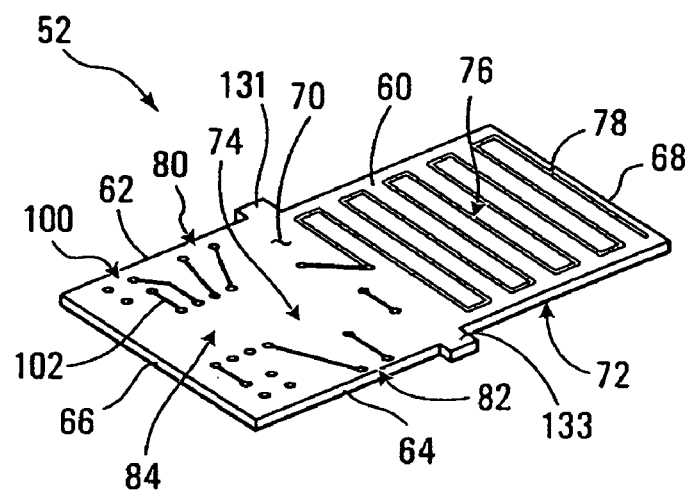
FIG. 4 is a perspective view of a circuit carrier apparatus of the pressure sensor apparatus shown in FIG. 1.

Referring to FIG. 4, the circuit carrier apparatus 52 includes a substrate 60 which, in this embodiment, includes a printed wiring board. The substrate 60 has first and second opposite edges 62 and 64, first and second opposite ends 66 and 68, and first and second opposite facing surfaces 70 and 72 respectively. A circuit portion shown generally at 74 is located on the first end 66 of the substrate 60 and an antenna portion shown generally at 76 is located on the second end 68. In this embodiment, the antenna portion 76 includes a radio frequency antenna shown at 78 comprised of a serpentine conductor formed on a surface of the second end 68. The serpentine conductor may be formed from an etched copper strip, for example.

The circuit portion 74 comprises, in this embodiment, first and second power supply mounts shown generally at 80 and 82 which, in this embodiment, are contact pads having through-holes through the substrate 60 for mounting pins of battery holders, for example to the substrate. In this embodiment, the first and second power supply mounts 80 and 82 are located on opposite sides of the substrate 60, near the first and second edges 62 and 64 respectively so that battery mounts such as battery holders 81 and 83 mounted thereto project upwardly from the first face surface 70 of the substrate to hold disk-shaped batteries 85 and 87 in an upright orientation, as shown in FIG. 3 such that axes of the batteries are generally parallel to the first surface 70 of the substrate 60.

Referring back to FIG. 4, the circuit portion 74 further comprises a pressure sensor mount shown generally at 84 which, in this embodiment, includes pads formed on the substrate to receive an integrated circuit pressure sensor such as an NPX-1 tire pressure sensor available from General Electric Industrial Sensing of Billerica, Mass., USA.

Referring back to FIG. 3, a pressure sensor 86 is shown mounted to the pressure sensor mount (84) and is located adjacent the power supply, and more particularly between the battery mounts 81 and 83. The pressure sensor 86 has a flat surface 88 extending about a pressure sensing opening 90 on the pressure sensor. The flat surface 88 is generally parallel and spaced apart from the first face surface 70.

Referring back to FIG. 4, the circuit portion 74 further includes ancillary component mounts, one of which is shown generally at 100, for mounting ancillary components for effecting a transmitter function. Such ancillary components may include transistors, resistors, capacitors, and a crystal for example.

In addition, the circuit portion 74 includes circuit interconnections, one of which is shown at 102, operably configured to extend between the power supply mounts 80 and 82, the pressure sensor mount 84, the ancillary component mounts 100 and the antenna 78 such that when the pressure sensor 86 is mounted to the pressure sensor mount 84 and ancillary components are mounted to the ancillary component mounts 100 these components are operable to receive power from a power supply mounted to the power supply mounts 80 and 82 such that a transmitter function is effected. The circuit interconnections and ancillary components connected thereto implement any of a plurality of commonly known RF transmitter circuits operable to produce an RF signal that will be radiated by the antenna portion 76. The transmitter function causes a transmittable signal to be produced by the ancillary components, in response to a pressure signal received from the pressure sensor 86. The transmittable signal is radiated by the antenna portion 76 for wireless reception by a remote receiver.

Figure 5:
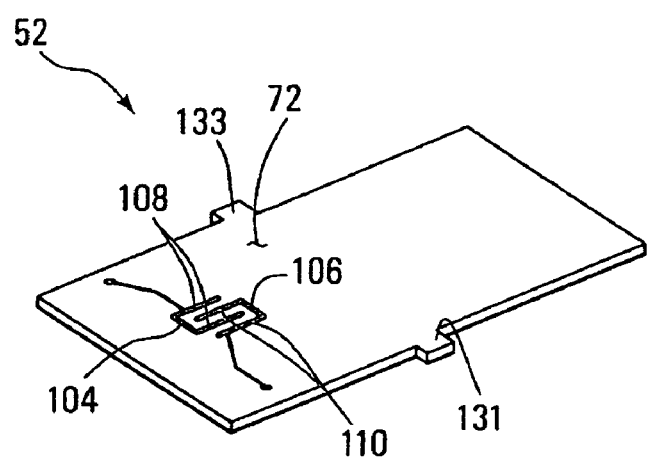
FIG. 5 is a perspective view of an underside of the circuit carrier apparatus shown in FIG. 4.

Referring to FIG. 5, in this embodiment, the second opposite face surface 72 has switch contacts 104 and 106 comprised of generally c-shaped traces on the second face surface 72. The switch contacts 104 and 106 have legs 108 and 110 that are juxtaposed to co-operate with a switch contactor shown in FIG. 8. The switch contacts 104 and 106 are connected by circuit interconnections to at least one of the ancillary component mounts 100, the power supply mounts 80 and 82 and the pressure sensor mount 84 to facilitate closing and opening a circuit involving at least one of the ancillary components connected to the ancillary component mounts 100, the power supply connected to the power supply mounts 80 and 82 and the pressure sensor 86 connected to the pressure sensor mount 84. For example, the switch contacts 104 and 106 may be connected to certain pins of the pressure sensor 86 to open and close a circuit associated therewith so as to place the pressure sensor 86 into a desired state of operation.

Figure 6:
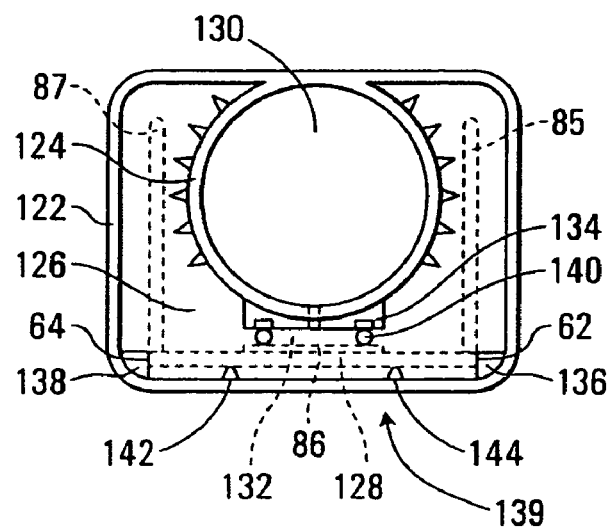
FIG. 6 is a rear end view of a housing of the pressure sensor apparatus shown in FIG. 1.

Referring back to FIG. 3, the housing 54 includes a body 120 having an outer wall 122 and an inner wall 124. Referring to FIG. 6, the outer wall defines a cavity 126 operably configured to hold the circuit carrier apparatus 52 as shown in broken outline at 128. The inner wall 124 is inside the cavity 126 and defines a generally cylindrical pressure sensing chamber 130. The inner wall 124 has an opening shown in broken outline at 132 extending between the pressure sensing chamber 130 and the cavity 126. A seal interface 134 is disposed about the opening 132 and, in this embodiment, includes a flat surface having an annular groove extending about the opening 132 seen best at 135 in FIG. 8.

The body 120 further includes alignment provisions including guides in the form of first and second stops provided by rigid portions of plastic 136 and 138 on opposite sides of a lower portion of the cavity 126. The rigid portions of plastic 136 and 138 act to laterally align the circuit carrier apparatus 52 such that the pressure sensing opening 90 in the pressure sensor 86, is aligned with the opening 132 in the inner wall 124 for communication of fluid between the pressure sensing chamber 130 and the pressure sensing opening shown at 90 in FIG. 3.

The first and second rigid portions of plastic 136 and 138 are operable to contact the first and second sides of the substrate 60 and more particularly in this embodiment the first and second edges 62 and 64 respectively, of the substrate, for confining lateral movement of the circuit apparatus in the cavity 126. This serves to laterally position the substrate relative to the inner wall 124. Referring to FIGS. 4 and 5, first and second alignment tabs 131 and 133 on opposite sides of the substrate also assist in aligning the substrate in the cavity 126.

The body 120 further includes urging provisions 139 for urging the pressure sensor against a seal 140 adjacent the seal interface 134 such that the pressure sensing opening 90 in the pressure sensor 86 is in fluid communication with the opening 132 in the pressure sensing chamber 130 and such that the seal 140 prevents ambient pressure from interfering with communication of fluid between the pressure sensing opening 90 and the pressure sensor and the opening 132 in the inner wall 124. In this embodiment the urging provisions act to provide a force on the second face surface 72 of the substrate 60. In this embodiment, the force is provided by first and second spaced apart supports 142 and 144 on the outer wall 122 and which face into the cavity 126. The first and second spaced apart supports 142 and 144 have leading inclined surfaces, only one of which is shown at 145 in FIG. 8. In effect, the first and second supports 142 and 144 push the second surface 72 of the substrate 60 toward the inner wall 124 and thereby press the flat surface 88 on the pressure sensor 86 against the seal 140 to thereby effect sealing about the opening 132 while permitting fluid communication between the opening 132 in the inner wall 124 and the pressure sensing opening 90 in the pressure sensor 86.

Referring to FIGS. 5 and 6, it will be appreciated that the switch contacts 104 and 106 are positioned adjacent the outer wall 122 shown in FIG. 6 and between the first and second supports 142 and 144 and face toward the outer wall 122.

Figure 7:
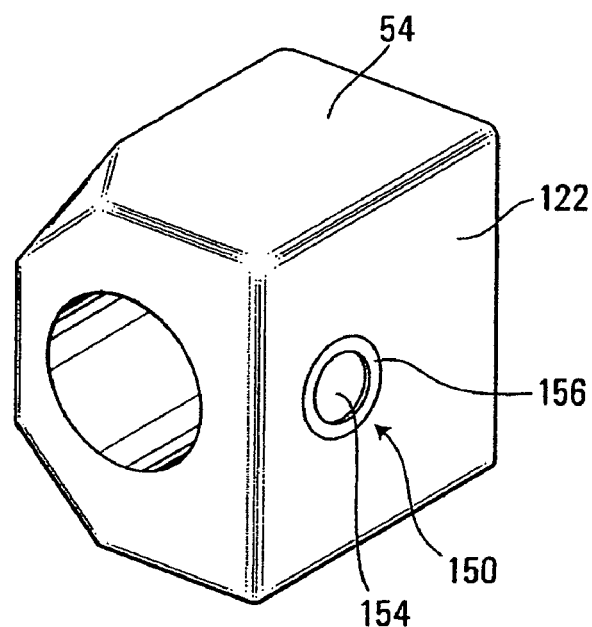
FIG. 7 is a perspective view showing a front, bottom, and left hand side of the housing shown in FIG. 6.
Figure 8:
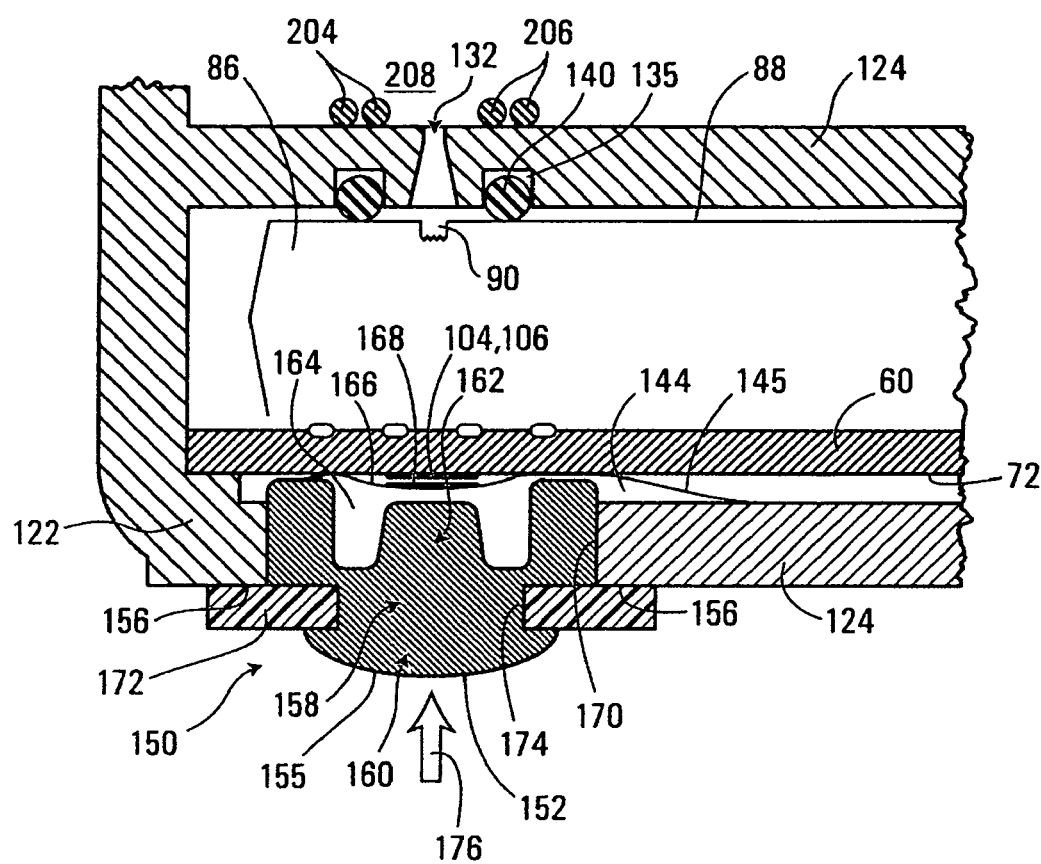
FIG. 8 is a fragmented cross-sectional view of a portion of the housing shown in FIG. 6 with the circuit carrier apparatus disposed therein.

Referring to FIG. 7, the housing 54 is formed with holding provisions shown generally at 150 for holding a switch actuator as shown at 152 in FIG. 8 in the outer wall 122 such that the switch actuator 152 is operable to make contact with the switch contacts 104 and 106 formed on the second face surface 72 of the substrate. To do this, referring to FIG. 7, the outer wall 122 has a switch opening 154 with a generally flat annular surface 156 surrounding the switch opening 154.

Referring to FIG. 8, in this embodiment, the resilient switch actuator 152 is formed of a resilient, elastic material such as rubber and is formed to include a shaft portion shown generally at 158, a head portion shown generally at 160, and a body portion shown generally at 162. The body portion has an annular recess 164 and a lower concaved surface 166 to which is connected an electrical contact 168 which is secured to the concaved surface 166 by adhesive, for example. The concaved surface 166 with the electrical contact 168 thereon is formed such that in the rest position shown in FIG. 8, the electrical contact 168 is not in contact with the switch contacts 104 and 106 on the second face surface 72 of the substrate 60.

The outer wall 122 has an inner cylindrical surface 170 defining the switch opening 154. The switch opening 154 receives the switch actuator 152 such that the cylindrical surface 170 bears upon the body portion 162 of the switch actuator 152 in relatively tight engagement therewith. A plastic washer 172 having an opening defined by an inner cylindrical wall 174 is operable to receive the shaft portion 158 of the switch actuator such that the head portion 160 extends on one side of the plastic washer 172 while the body portion 162 extends on an opposite side of the plastic washer 172. This permits the plastic washer with resilient switch actuator 152 secured thereto to be placed on the flat annular surface 156 and laser welded thereto to secure the switch actuator 152 in place, in the switch opening 154. The opening defined by the cylindrical surface 174 permits access to a surface 155, in this embodiment the head portion 160 of the switch actuator 152, to enable a user to press the head of the actuator. Since the switch actuator 152 is formed of resilient elastic rubber, the shaft portion 158 is dimensioned to be about as long as the thickness of the plastic washer 172 such that the shaft portion 158 is held tightly in the opening of the plastic washer 172. The head portion 160 is larger than the shaft portion 158 and prevents ingress of moisture and fluid through the opening 154. The body portion 162 is also larger than the shaft portion and seals the opening 154 from inside the cavity 126.

When a user presses the head portion 160 inwardly in the direction of arrow 176, the body portion 162 deforms such that the electrical contact 168 bridges the switch contacts 104 and 106 on the second face surface 72 of the substrate 60 to thereby complete the circuit to which the switch contacts 104 and 106 are connected.

Figure 9:
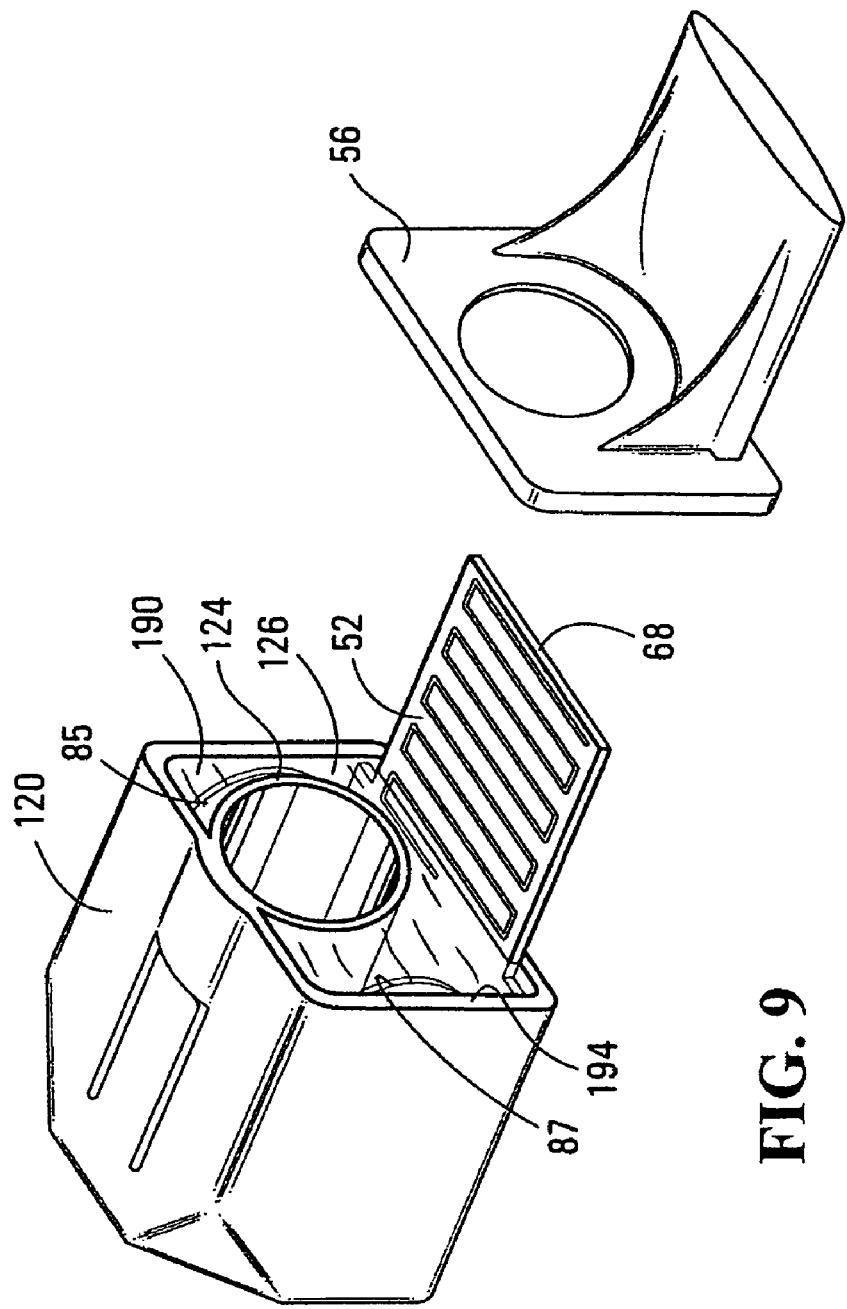
FIG. 9 is an exploded perspective view of the housing shown in FIG. 6, with the circuit carrier apparatus installed therein, and ready to receive a cover for sealing the circuit carrier apparatus within the housing.

Referring to FIG. 9, the circuit carrier apparatus 52 is received in the cavity 126 such that the batteries 85 and 87 are positioned on opposite sides of the inner wall 124. Potting material 190 is injected into the cavity to secure the circuit assembly therein and to fill all voids in the cavity to essentially make the housing body 120 and the circuit carrier apparatus 52 a unitary device.

Referring back to FIGS. 3 and 9, the cover 56 has a mating face 192 that mates with an edge 194 of the housing body 120. In addition, the cover 56 has a cavity 196 dimensioned to snugly receive the second end 68 of the circuit carrier apparatus 52 therein when the face 192 is placed in contact with the edge 194. The cover 56 is then laser welded to the housing body 120 to form a unitary pressure sensing device as shown at 10 in FIG. 1. The cover 56 thus covers the antenna portion and is sealingly engaged with the housing 54 to prevent ingress and/or egress of fluid relative to the cavity 126 in the housing and the cavity 196 in the cover 56.

Still referring to FIG. 3, it will be appreciated that the inner wall 124 defines a first opening 200 into the pressure sensing chamber 130 and the outer wall 122 defines a second opening 202 of the pressure sensing chamber 130. The second opening 202 is generally coaxial with the first opening 200 to permit the projection 16 on the pressure coupling 12 to be inserted into the first opening to extend through the pressure sensing chamber 130 such that a portion of the pressure coupler extends out of the second opening 202 as shown in FIGS. 1 and 2.

In the embodiment shown, the portion that extends out of the second opening 202 is the threaded end 20 of the pressure coupling 12. The threaded end emulates a valve stem and cooperates with air filling equipment such as an air hose at a service station, for example. This allows air to be admitted into the tire without the requirement to remove the pressure sensor from the valve stem 17, which greatly enhances the convenience of the apparatus.

First and second pairs 204 and 206 of O-ring seals are disposed on opposite sides of the opening 34 such that fluid in the opening 34 cannot flow out of the inlet opening 14. The housing 54 is dimensioned such that when the projection 16 is fully inserted into the pressure sensing chamber 130, the opening 132 in the inner wall 124 is longitudinally aligned to communicate with an annular space 208 extending about the outer surface of the projection, adjacent the opening 34. Referring to FIGS. 2 and 8, fluid exiting the opening 34 can enter the annular space 208 and move through the opening 132 in the inner wall 124 and into the pressure sensing opening 90 in the pressure sensor 86, to cause fluid pressure at that opening to be the same as the fluid pressure in the system being measured, thereby enabling the pressure sensor 86 to sense fluid pressure in the system being measured.

The pressure coupling described and shown herein is only one of a plurality of different pressure coupling devices that may be used with the above described pressure sensor apparatus 11. Referring to FIG. 2, the body 13 and projection 16 have a particular external profile comprised of a cylindrical wall having successive portions 210, 212 and 214 of different diameters two of which, 210 and 212, have grooves for holding O-rings 204 and 206, for example. This external profile is particularly well adapted to cooperate with the generally cylindrical inner wall 124 of the housing 120 of the pressure sensor apparatus 11. In particular, the O-rings seal against the inner wall 124 to provide the generally annular space 208 which is sealed off by the o-rings from ambient, but in communication with the opening 132 in the inner wall and in communication with the pressure sensor 86, inside the housing 120. The portion 214 has a larger diameter than the other two portions 210 and 212, and acts to align the projection 16 in the pressure sensing chamber formed by the inner wall 124, to prevent off-axis movement of the pressure coupler relative to the pressure sensor apparatus 11, which could otherwise occur due to the elastic nature of the O-rings.

Figure 10:
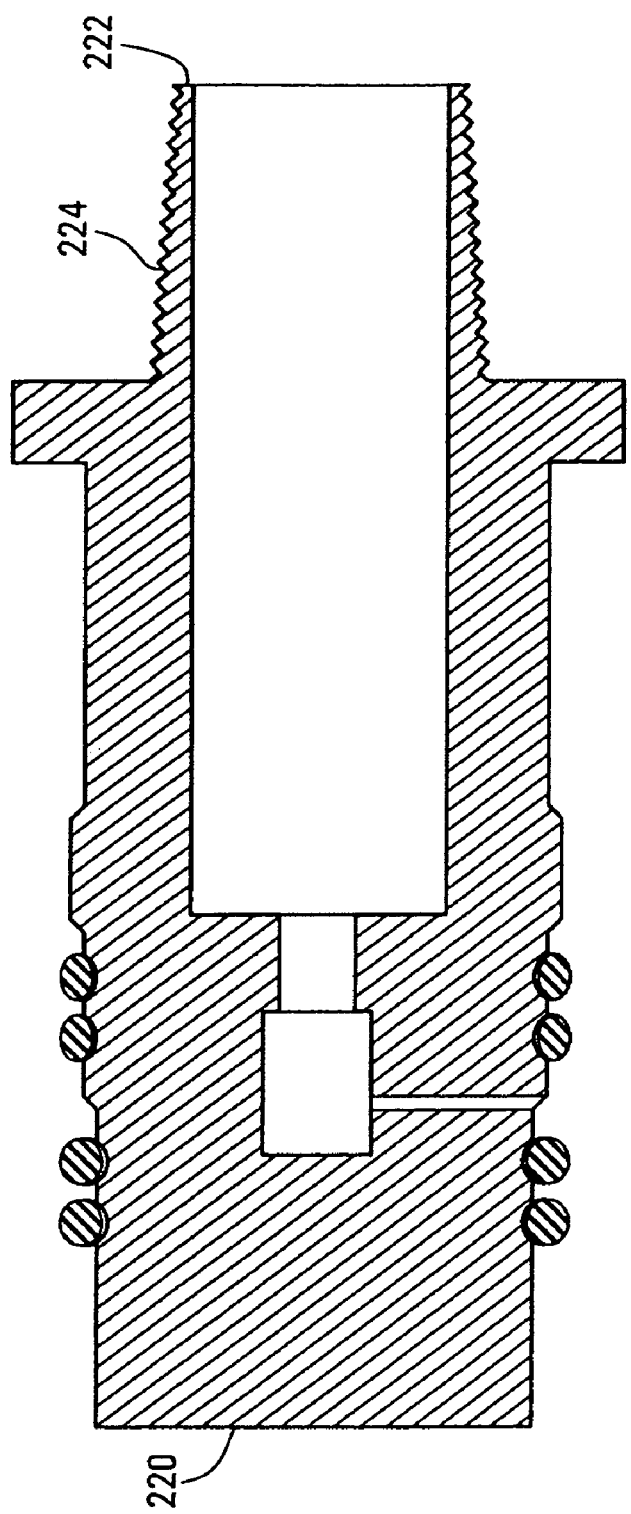
FIG. 10 is a cross-sectional view of a pressure coupler according to a first alternative embodiment of the invention.

While the pressure coupling described herein is one which is intended for use in monitoring tire pressure, for example, it will be appreciated that by maintaining the same or a similar outer wall profile, pressure couplers of different types having different ends but having the same wall profile as shown in FIG. 2, could be substituted for the pressure coupler described. Thus, for example, instead of the threaded end 20, referring to FIG. 10, the pressure coupler might simply have a sealed stub end 220, where the pressure sensor is not intended to be used on a system that requires the ability to admit fluid into or out of the pressurized system without removing the pressure sensor. The opposite end 222 may have a pipe thread 224, for example. This type of coupler may be used to mount the pressure sensor apparatus 11 inside a vehicle wheel, for example.

Figure 11:
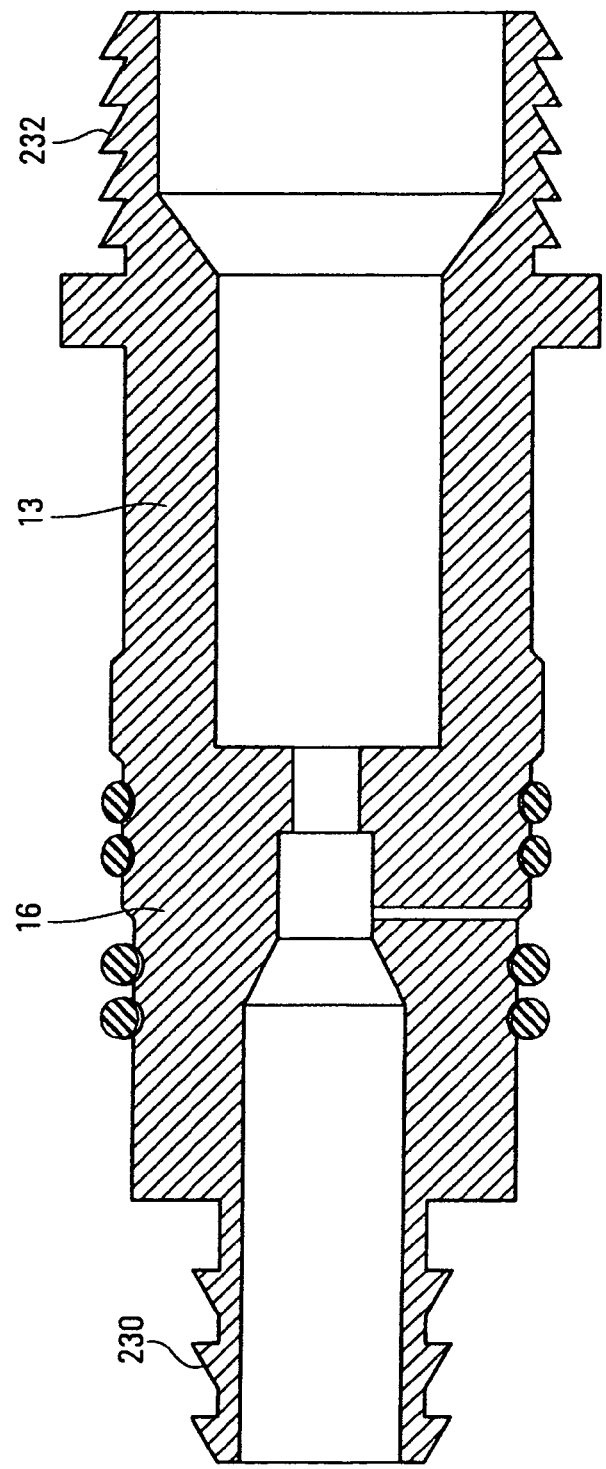
FIG. 11 is a cross-section view of a pressure coupler according to a second alternative embodiment of the invention.
Figure 12:
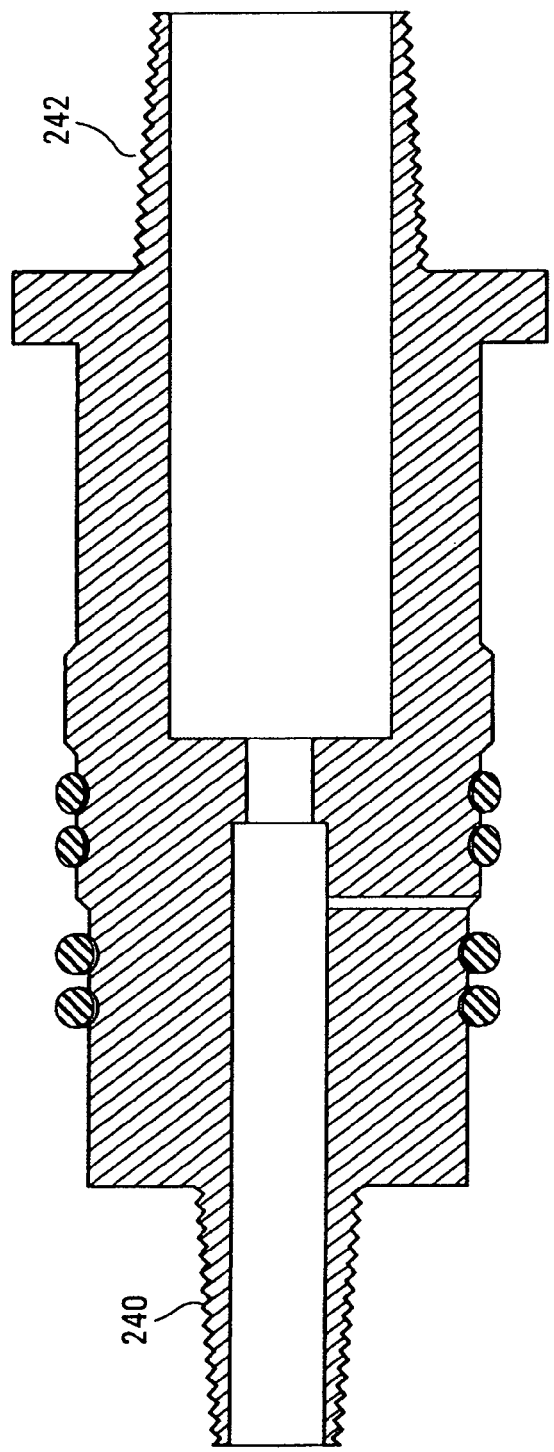
FIG. 12 is a cross-sectional view of a pressure coupler according to a third alternative embodiment of the invention.

Referring to FIG. 11, in another embodiment, the pressure coupler may have hose barbs 230 and 232 at opposite ends, replacing the threaded end (20 in FIG. 2) and extending from the body 13, for example, for connecting the pressure coupler to hoses or conduits in a pressurized system or, referring to FIG. 12, the pressure coupler may have pipe threads 240, 242 at opposite ends. A pressure coupler of this type may be used to couple the pressure sensor apparatus 11 to an air brake system on a vehicle, for example, or to an air line of an air operated circuit breaker in a power station, for example.

Figure 13:
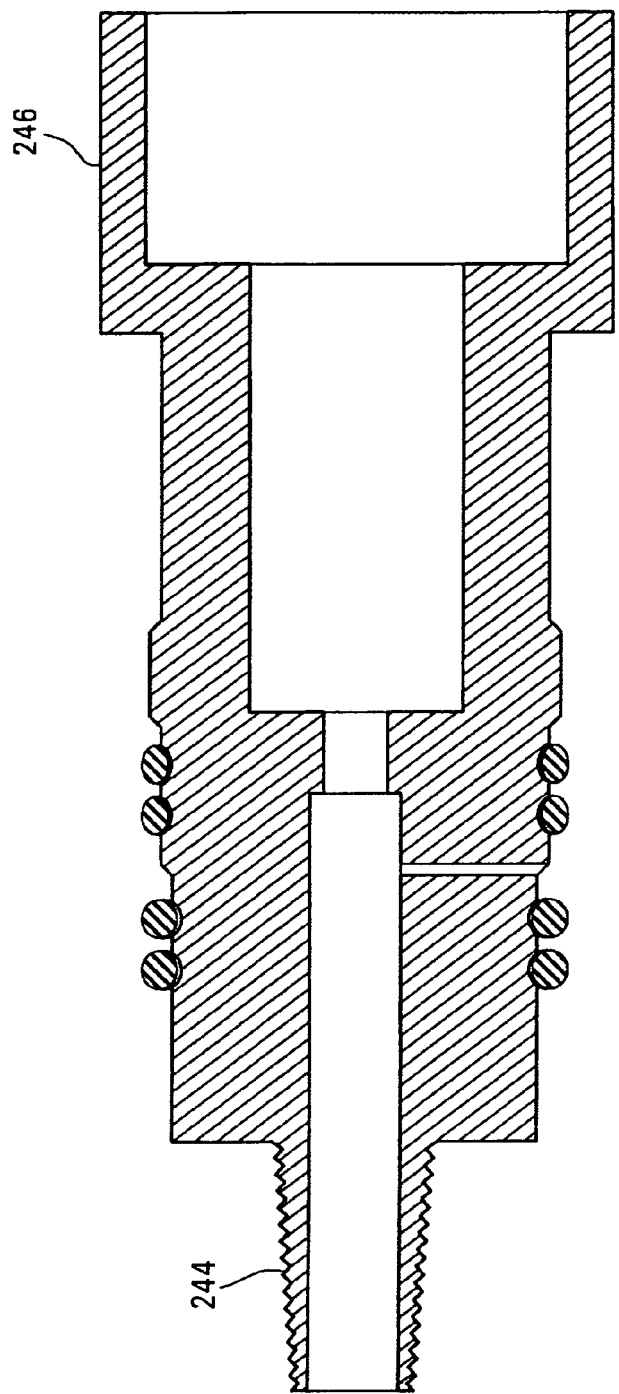
FIG. 13 is a cross-sectional view of a pressure coupler according to a fourth alternative embodiment of the invention.

Referring to FIG. 13, in another embodiment, the pressure coupler may have a pipe thread 244 at one end and a pvc pipe fitting 246 at an opposite end.

Figure 14:
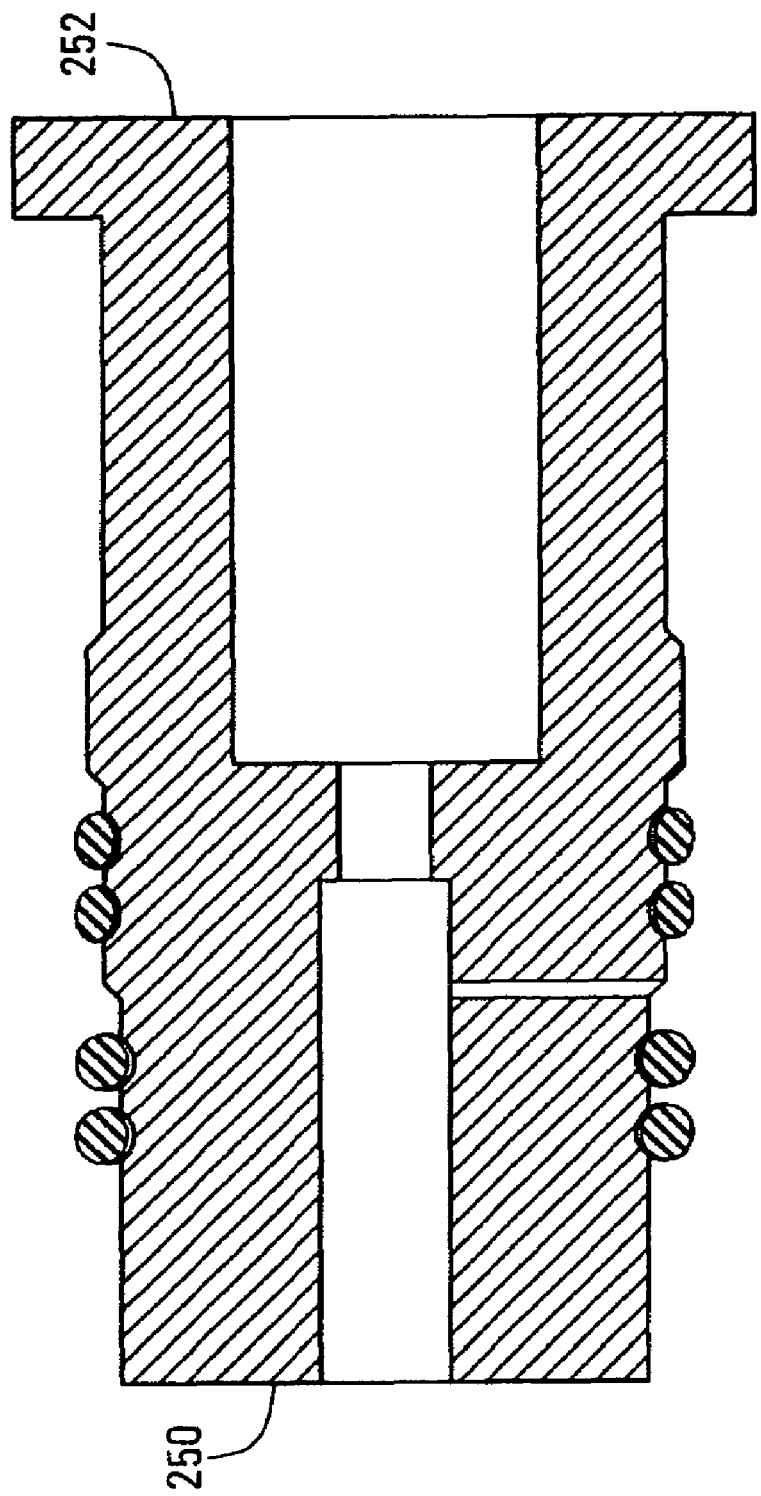
FIG. 14 is a cross-sectional view of a pressure coupler according to a fifth alternative embodiment of the invention.

Referring to FIG. 14, in another embodiment, the pressure coupler may simply have open ends, 250, 252, for example, and this may be used to allow a pressure sensor apparatus to be used to monitor ambient air pressure.

While specific embodiments of the invention have been described and illustrated, such embodiments should be considered illustrative of the invention only and not as limiting the invention as construed in accordance with the accompanying claims.

What is claimed is:

1. A method of producing a circuit carrier for mounting components of a pressure sensing circuit, the method comprising:
  forming on a substrate a circuit portion and an antenna portion,
    wherein forming said antenna portion comprises forming a radio frequency antenna on said antenna portion; and
    wherein forming said circuit portion comprises:
      causing at least one power supply mount for a power supply for the pressure sensing circuit to be formed at a side of said substrate such that the power supply projects outwardly from said substrate;
      causing a pressure sensor mount to be formed on said substrate such that when a pressure sensor is mounted to said mount a flat surface about a sensor opening of the pressure sensor is generally parallel and spaced apart from a first surface of said substrate and is adjacent the power supply;
      causing ancillary component mounts to be formed in said circuit portion, said ancillary component mounts being operable to facilitate mounting of ancillary components for effecting a transmitter function; and
      causing circuit interconnections between said at least one power supply mount, said pressure sensor mount and said ancillary component mounts and said antenna to be formed on said substrate such that a pressure sensor mounted to said pressure sensor mount and ancillary components mounted to said ancillary component mounts and are operable to receive power from a power supply mounted to said power supply mount and such that when the pressure sensor and ancillary components receive power from the power supply the transmitter function is effected, the transmitter function being operable to produce a transmittable signal in response to a pressure signal received from the pressure sensor, the transmittable signal being operable to be radiated by said antenna, for wireless reception by a remote receiver.

2. The method of claim 1 wherein said power supply mount includes a battery mount.

3. The method of claim 2 wherein said battery mount includes first and second battery mounts on opposite sides of said substrate, said pressure sensor mount being located between said first and second battery mounts.

4. The method of claim 3 wherein said first and second battery mounts are operably configured to facilitate mounting of disk-shaped batteries such that axes of said disk shaped batteries are generally parallel to a top surface of said substrate.

5. The method of claim 1 wherein forming said circuit portion and said antenna portion comprises causing said circuit portion to be located on a first end of said substrate and causing said antenna portion to be located on a second end of said substrate.

6. The method of claim 5 wherein forming said antenna portion comprises forming a serpentine conductor on said second end of said substrate.

7. The method of claim 1 wherein causing said ancillary component mounts to be formed in said circuit portion comprises causing switch contacts to be formed on said substrate, for mounting a switch thereto, and wherein causing said circuit interconnections to be formed on said substrate comprises causing said circuit interconnections to connect said switch contacts to at least one of said ancillary component mounts, said power supply mount and said pressure sensor mount.

8. The method of claim 7 wherein causing said switch contacts to be formed on said substrate comprises causing said switch contacts to be formed on a second surface of said substrate, wherein said second surface is generally parallel and spaced apart from said first surface.

9. A method of producing a pressure sensor circuit assembly comprising installing a power supply on said power supply mount of the circuit carrier of claim 1, installing a pressure sensor on said pressure sensor mount of the circuit carrier of claim 1 and, installing ancillary components on said ancillary component mounts of the circuit carrier of claim 1, such that said ancillary components are operable to effect the transmitter function.

10. A method of housing the pressure sensor circuit assembly of claim 9, the method comprising:
receiving said circuit portion in a cavity of a body having a wall defining a pressure sensing chamber such that said opening in said pressure sensor is aligned with an opening in said pressure sensing chamber; and
urging said substrate in a direction tending to press said flat surface of said pressure sensor against a seal between said flat surface and a portion of said wall defining said pressure sensing chamber, such that said sensor opening of the pressure sensor is in fluid communication with said opening in said pressure sensing chamber and such that said seal prevents ambient pressure from interfering with communication of fluid between said sensor opening of the pressure sensor and said opening in said pressure sensing chamber.

11. The method of claim 10 wherein receiving comprises aligning said sensor opening of the pressure sensor with said opening in said pressure sensing chamber.

12. The method of claim 11 wherein aligning comprises guiding said circuit assembly into a position relative to said pressure chamber such that said sensor opening of the pressure sensor is aligned with said opening in said pressure sensing chamber.

13. The method of claim 12 wherein guiding comprises confining lateral movement of said circuit assembly.

14. The method of claim 12 wherein guiding comprises guiding edges on opposite sides of said substrate to position said substrate relative to said pressure sensing chamber while said substrate is moved into said cavity.

15. The method of claim 10 wherein urging comprises applying a force to a second surface of said substrate, said second surface being opposite said first surface.

16. The method of claim 15 wherein applying said force comprises causing said second surface of said substrate to bear upon a support in said cavity.

17. The method of claim 16 wherein causing said second surface of said substrate to bear upon said support comprises causing said second surface to bear upon first and second spaced apart supports.

18. The method of claim 15 further comprising holding a switch actuator adjacent switch contacts formed on said substrate.

19. The method of claim 18 wherein holding comprises receiving said switch actuator in an opening in said wall.

20. The method of claim 19 wherein holding comprises fastening a holder to said wall such that a surface of said switch actuator is accessible from outside said body.

21. A circuit carrier apparatus for a fluid pressure sensor, the apparatus comprising:
a substrate having first and second opposite edges, first and second opposite ends and first and second opposite facing surfaces;
a circuit portion on said first end and an antenna portion on said second end,
wherein said antenna portion comprises a radio frequency antenna; and
wherein said circuit portion comprises:
at least one power supply mount for a power supply for a pressure sensing circuit, said power supply mount being located at a side of said substrate and such that the power supply projects outwardly from said substrate;
a pressure sensor mount formed on said substrate such that when a pressure sensor is mounted to said mount, a flat surface about a sensor opening on the pressure sensor is generally parallel and spaced apart from the first opposite facing surface and is adjacent the power supply;
ancillary component mounts formed in said circuit portion, said ancillary component mounts being operable to facilitate mounting of ancillary components for effecting a transmitter function; and
circuit interconnections between said at least one power supply mount, said pressure sensor mount and said ancillary component mounts and said antenna such that a pressure sensor mounted to said pressure sensor mount and ancillary components mounted to said ancillary component mounts are operable to receive power from a power supply mounted to said power supply mount and such that when the pressure sensor and ancillary components receive power from the power supply a transmitter function is effected, the transmitter function being operable to produce a transmittable signal in response to a pressure signal received from the pressure sensor, the transmittable signal being operable to be radiated by said antenna, for wireless reception by a remote receiver.

22. The apparatus of claim 21 wherein said power supply mount includes a battery mount.

23. The apparatus of claim 22 wherein said battery mount includes first and second battery mounts on opposite sides of said substrate, said pressure sensor mount being located between said first and second battery mounts.

24. The apparatus of claim 23 wherein said first and second battery mounts are operably configured to facilitate mounting of disk-shaped batteries such that axes of said disk shaped batteries are generally parallel to a top surface of said substrate.

25. The apparatus of claim 21 wherein said antenna portion comprises a serpentine conductor on said second opposite end of said substrate.

26. The apparatus of claim 21 further comprising switch contacts formed on said substrate, for cooperating with a switch contactor, said switch contacts being connected by said circuit interconnections to at least one of said ancillary component mounts, said power supply mount and said pressure sensor mount.

27. The apparatus of claim 26 wherein said switch contacts are formed on said second opposite facing surface of said substrate.

28. A pressure sensor circuit apparatus comprising the circuit carrier of claim 21 and further comprising:
a power supply installed on said power supply mount;

a pressure sensor installed on said pressure sensor mount
ancillary components installed on said ancillary component mounts, such that said ancillary components are operable to effect the transmitter function.

29. An apparatus for housing a pressure sensor circuit, the apparatus comprising:
a body having:
an outer wall defining a cavity operably configured to hold a substrate carrying a pressure sensor having a pressure sensing opening;
an inner wall inside said cavity defining a pressure sensing chamber;
an opening in said inner wall;
a seal interface about said opening;
aligning means for aligning said pressure sensor opening with said opening in said inner wall to provide for communication of fluid between said pressure sensing chamber and said pressure sensing opening; and
urging means for urging said pressure sensor against a seal adjacent said seal interface, such that said pressure sensing opening is in fluid communication with said opening in said inner wall and such that the seal prevents ambient pressure from interfering with communication of fluid between said pressure sensing opening and said opening in said inner wall.

30. The apparatus of claim 29 wherein said aligning means comprises guiding means for guiding said substrate into a position in which said pressure sensing opening is aligned with said opening in said inner wall.

31. The apparatus of claim 30 wherein said guiding means comprises stops operable to contact first and second sides of said substrate for confining lateral movement of said pressure sensor circuit.

32. The apparatus of claim 31 wherein said first and second sides of said substrate have first and second edges respectively, and wherein said stops include first and second stops operably configured to bear upon said first and second edges to laterally position said substrate relative to said inner wall.

33. The apparatus of claim 29 wherein said urging means comprises means for applying a force on a surface of said substrate.

34. The apparatus of claim 33 wherein said means for applying a force comprises a support on said outer wall of said body and facing inside said cavity, wherein said surface of said substrate bears upon said support.

35. The apparatus of claim 34 wherein said support comprises first and second spaced apart supports on said outer wall and facing into said cavity, wherein said surface of said substrate bears upon said first and second supports.

36. The apparatus of claim 29 further comprising holding means for holding a switch actuator in said outer wall such that the switch actuator is operable to make contact with switch contacts formed on said surface of said substrate.

37. The apparatus of claim 36 wherein said holding means includes a switch opening and wherein said switch opening is operable to receive the switch actuator.

38. The apparatus of claim 37 wherein said holding means further comprises a flat member having an opening permitting access to a surface of said switch actuator said flat member being fastened to said body such that said switch actuator provides a seal to prevent ingress and egress of fluid relative to said cavity through said switch actuator opening.

39. A pressure sensor apparatus comprising:
a) a circuit carrier apparatus comprising:
a substrate having first and second opposite edges, first and second opposite ends and first and second opposite facing surfaces;
a circuit portion on said first opposite end and an antenna portion on said second opposite end,
wherein said antenna portion comprises a radio frequency antenna; and
wherein said circuit portion comprises:
at least one power supply located at a side of said substrate and such that the power supply projects outwardly from said substrate;
a pressure sensor having a flat surface and a pressure sensor opening on said flat surface, said flat surface being generally parallel and spaced apart from the first opposite facing surface and adjacent the power supply;
a transmitter connected to said pressure sensor and said antenna for producing a signal for radiation by said antenna in response to a sense signal produced by said pressure sensor;
b) a housing for housing said circuit carrier apparatus, said housing comprising:
a body having:
an outer wall defining a cavity operably configured to hold the circuit portion of said substrate;
an inner wall inside said cavity defining a pressure sensing chamber;
an opening in said inner wall;
a seal about said opening in said inner wall;
aligning means for aligning said pressure sensor opening with said opening in said inner wall to provide for communication of fluid between said pressure sensing chamber and said pressure sensor opening; and
urging means for urging said pressure sensor against said seal, such that said pressure sensor opening is in fluid communication with said opening in said inner wall and such that said seal prevents ambient pressure from interfering with communication of fluid between said opening in said pressure sensor opening and said opening in said inner wall;
potting material in said cavity and about said circuit portion for securing said substrate in said cavity; and
a cover for covering said antenna portion, said cover being sealingly engaged with said housing to prevent ingress and egress of fluid relative to said cavity.

40. The apparatus of claim 39 wherein said inner wall defines a first opening into said pressure sensing chamber, said first opening being operable to receive a pressure coupling for coupling fluid pressure from a pressurized system to said pressure sensing chamber.

41. The apparatus of claim 40 wherein said outer wall defines a second opening into said pressure sensing chamber, said second opening being generally coaxial with said first opening to permit a projection on said pressure coupling to be inserted into said first opening to extend through said pressure sensing chamber such that a portion of said pressure coupling extends out of said second opening.

42. The apparatus of claim 41 wherein said aligning means comprises guiding means for guiding said substrate into said a position in which said pressure sensor opening is aligned with said opening in said inner wall.

43. The apparatus of claim 42 wherein said guiding means comprises stops operable to contact said first and second sides of said substrate for confining lateral movement of said circuit assembly.

44. The apparatus of claim 42 wherein said first and second sides of said substrate have first and second edges respectively, and wherein said stops include first and second stops operably configured to bear said first and second edges to laterally position said substrate relative to said inner wall.

45. The apparatus of claim 41 wherein said urging means comprises means for applying a force to said second opposite surface of said substrate.

46. The apparatus of claim 45 wherein said means for applying a force comprises a support on said outer wall of said body, said support facing inside said cavity, said second opposite facing surface of said substrate bearing upon said support.

47. The apparatus of claim 46 wherein said support comprises first and second spaced apart supports on said outer wall and facing into said cavity, wherein said second opposite facing surface of said substrate bears upon said support.

48. The apparatus of claim 46 wherein said circuit portion comprises switch contacts formed on said second opposite facing surface of said substrate, said switch contacts being operably connected to said pressure sensor and wherein said apparatus further comprises a switch actuator and holding means for holding said switch actuator in said outer wall such that said switch actuator is operable to make contact with said switch contacts.

49. The apparatus of claim 48 wherein said holding means includes a switch opening operably configured to hold said switch actuator.

50. The apparatus of claim 49 wherein said holding means further comprises a flat member having an opening permitting access to a surface of said switch actuator, said flat member being fastened to said body such that said switch actuator provides a sealing function to prevent ingress and egress of fluid relative to said cavity through said opening.

51. A pressure sensing system comprising the pressure sensor apparatus of claim 39 and a pressure coupler operably configured to communicate with said pressure sensing chamber to communicate fluid pressure to said pressure sensor.

52. The pressure sensing system of claim 51 wherein said pressure coupler comprises a projection having an inlet opening operably configured to communicate with a pressurized system to receive pressurized fluid therefrom, and wherein said projection and said pressure sensing chamber are operably configured such that said projection is sealingly received in said pressure sensing chamber and such that fluid entering said inlet opening is communicated to said pressure sensor through said pressure sensing chamber.

* * * * *